United States Patent
Yahner

(10) Patent No.: US 11,435,749 B2
(45) Date of Patent: Sep. 6, 2022

(54) SYSTEMS AND METHODS FOR TRANSFERRING ROUTES BETWEEN MATERIAL HANDLING VEHICLES

(71) Applicant: The Raymond Corporation, Greene, NY (US)

(72) Inventor: Joseph Thomas Yahner, Chenango Forks, NY (US)

(73) Assignee: The Raymond Corporation, Greene, NY (US)

(*) Notice: Subject to any disclaimer, the term of this patent is extended or adjusted under 35 U.S.C. 154(b) by 126 days.

(21) Appl. No.: 17/081,554

(22) Filed: Oct. 27, 2020

(65) Prior Publication Data

US 2021/0124362 A1  Apr. 29, 2021

Related U.S. Application Data

(60) Provisional application No. 62/926,864, filed on Oct. 28, 2019.

(51) Int. Cl.
| | | |
|---|---|---|
| *G05D 1/02* | (2020.01) | |
| *G05D 1/00* | (2006.01) | |
| *G06Q 10/08* | (2012.01) | |

(52) U.S. Cl.
CPC ......... *G05D 1/0223* (2013.01); *G05D 1/0027* (2013.01); *G05D 1/0088* (2013.01); *G06Q 10/087* (2013.01); *G05D 2201/0216* (2013.01)

(58) Field of Classification Search
CPC .. G05D 1/0223; G05D 1/0027; G05D 1/0088; G05D 2201/0216; G06Q 10/087
See application file for complete search history.

(56) References Cited

U.S. PATENT DOCUMENTS

| | | |
|---|---|---|
| 6,454,036 B1 | 9/2002 | Airey |
| 6,760,645 B2 | 7/2004 | Kaplan |
| 8,594,923 B2 | 11/2013 | Wong |
| 8,843,236 B2 | 9/2014 | Barajas |
| 8,958,912 B2 | 2/2015 | Blumberg |
| 9,925,662 B1 | 3/2018 | Jules |
| 10,429,188 B2 | 10/2019 | Robinson |
| 10,578,443 B2 | 3/2020 | Sullivan |
| 10,578,447 B2 | 3/2020 | Sullivan |
| 10,620,626 B2 | 4/2020 | Sullivan |
| 10,650,300 B2 | 5/2020 | Dotson |
| 2004/0010343 A1 | 1/2004 | Dean |
| 2012/0239238 A1 | 9/2012 | Harvey |
| 2012/0323431 A1 | 12/2012 | Wong |
| 2013/0245824 A1 | 9/2013 | Barajas |

(Continued)

FOREIGN PATENT DOCUMENTS

| | | |
|---|---|---|
| CN | 107577232 A | 1/2018 |
| JP | 2002127058 A | 5/2002 |
| WO | 2018183524 A1 | 10/2018 |

*Primary Examiner* — Ramsey Refai
(74) *Attorney, Agent, or Firm* — Quarles & Brady LLP

(57) ABSTRACT

A method for transferring route information between material handling vehicles is provided. The method includes operating a first material handling vehicle along a route and collecting operation information, transferring the operation information to a warehouse management system that includes a transfer matrix, processing operation information with the transfer matrix, and transferring the processed operation information to a second material handling vehicle.

20 Claims, 5 Drawing Sheets

(56) References Cited

U.S. PATENT DOCUMENTS

| | | | |
|---|---|---|---|
| 2014/0358353 A1 | 12/2014 | Ibanez-Guzman | |
| 2014/0371907 A1 | 12/2014 | Passot | |
| 2016/0096270 A1 | 4/2016 | Ibarz Gabardos | |
| 2016/0266578 A1* | 9/2016 | Douglas | G05D 1/0022 |
| 2018/0059682 A1 | 3/2018 | Thode | |
| 2018/0143634 A1 | 5/2018 | Ott | |
| 2018/0328743 A1* | 11/2018 | Sullivan | G05D 1/0214 |
| 2019/0368876 A1 | 12/2019 | Robinson | |
| 2019/0373476 A1* | 12/2019 | High | G05D 1/0214 |
| 2020/0033143 A1 | 1/2020 | Hiramatsu | |
| 2020/0173787 A1 | 6/2020 | Sullivan | |

* cited by examiner

SYSTEMS AND METHODS FOR TRANSFERRING ROUTES BETWEEN MATERIAL HANDLING VEHICLES

CROSS-REFERENCES TO RELATED APPLICATIONS

The present application is based on and claims priority to U.S. Provisional Patent Application No. 62/926,864, filed on Oct. 28, 2019, and entitled "Systems and Methods for Transferring Routes Between Material Handling Vehicles."

STATEMENT REGARDING FEDERALLY SPONSORED RESEARCH

Not Applicable.

BACKGROUND

Material handling vehicles transport goods in a physical environment. Warehouses that employ the use of material handling vehicles, specifically autonomous or semi-autonomous material handling vehicles, may require a means to control and operate the material handling vehicles.

BRIEF SUMMARY

The present disclosure relates generally to material handling vehicles and, more specifically, to transferring learned routes from one material handling vehicle to another.

In one aspect, the present disclosure provides a method for transferring route information between material handling vehicles. The method includes operating a first material handling vehicle along a route and collecting operation information. The first material handling vehicle can have a first geometry. The method further includes transferring the operation information to a warehouse management system. The warehouse management system includes a transfer matrix. The method further includes processing the operation information with the transfer matrix. The method further includes transferring processed operation information to a second material handling vehicle. The second material handling vehicle can have a second geometry that is distinct from the first geometry.

In another aspect, the present disclosure provides a method for operating an autonomous material handling vehicle. The method includes guiding a manned material handling vehicle along a route and collecting operation information. The method further includes transferring the operation information to a database. The database can include a map. The method further includes inputting a parameter of the manned material handling vehicle and of an unmanned material handling vehicle into a transfer matrix. The method further includes processing information from the database with the transfer matrix, transferring processed operation information to the unmanned material handling vehicle, and operating the unmanned material handling vehicle along the route.

In one aspect, the present disclosure provides a warehouse management system configured to support warehouse operations. The warehouse management system includes a coordinate map of an operating environment, a database, and a transfer matrix that is configured to receive quantitative parameters of a first material handling vehicle and a second material handling vehicle.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION

Figure 1:
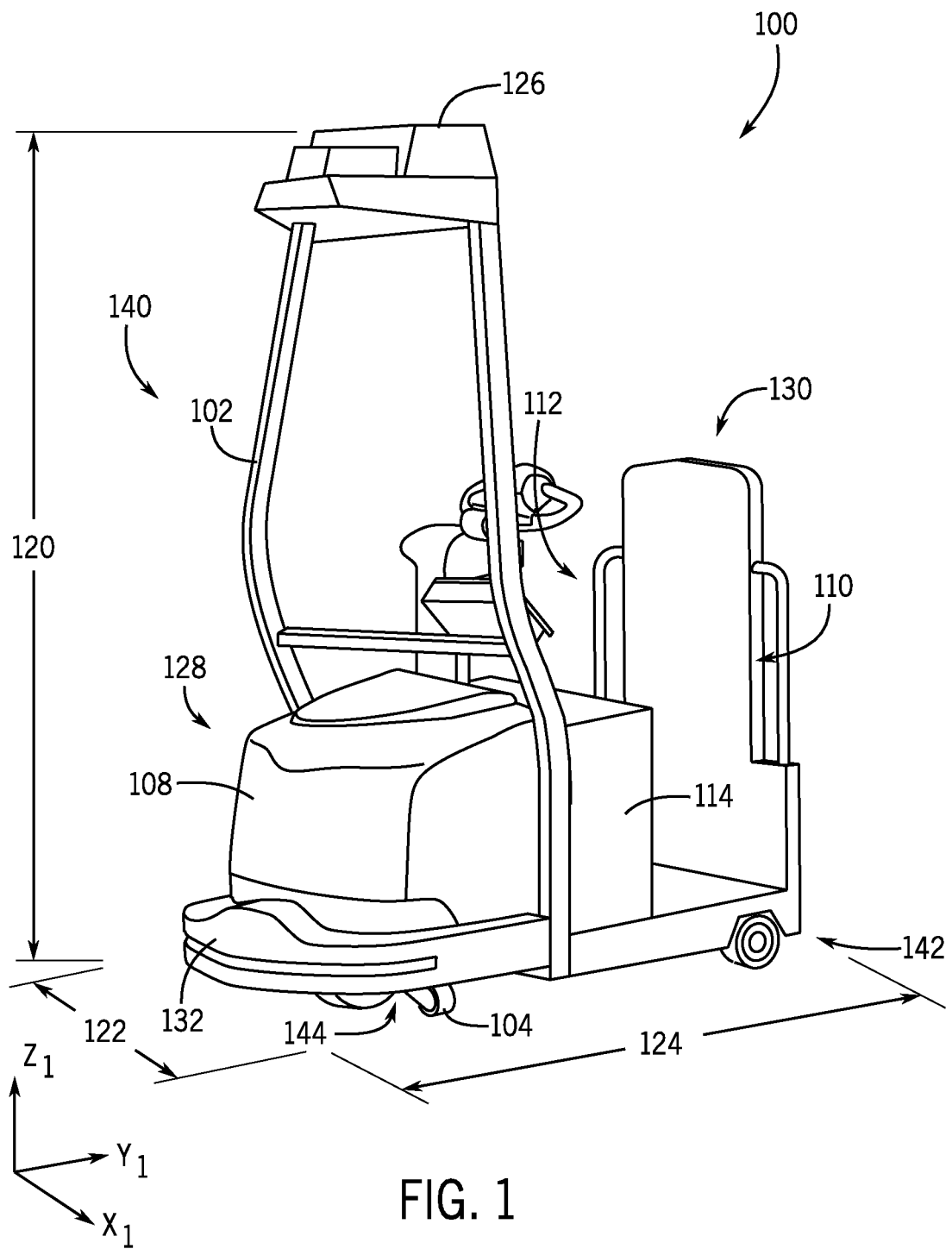
FIG. 1 is an isometric view of a material handling vehicle according to aspects of the present disclosure.

Before any aspect of the present disclosure are explained in detail, it is to be understood that the present disclosure is not limited in its application to the details of construction and the arrangement of components set forth in the following description or illustrated in the following drawings. The present disclosure is capable of other configurations and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use aspects of the present disclosure. Various modifications to the illustrated configurations will be readily apparent to those skilled in the art, and the generic principles herein can be applied to other configurations and applications without departing from aspects of the present disclosure. Thus, aspects of the present disclosure are not intended to be limited to configurations shown, but are to be accorded the widest scope consistent with the principles and features disclosed herein. The following detailed description is to be read with reference to the figures, in which like elements in different figures have like reference numerals. The figures, which are not necessarily to scale, depict selected configurations and are not intended to limit the scope of the present disclosure. Skilled artisans will recognize the non-limiting examples provided herein have many useful alternatives and fall within the scope of the present disclosure.

It is also to be appreciated that material handling vehicles are designed in a variety of configurations to perform a variety of tasks. It will be apparent to those of skill in the art that the present disclosure is not limited to any specific material handling vehicle, and can also be provided with various other types of vehicle configurations, including for example, order pickers, SWING-REACH®, and any other lift vehicles. The various systems and methods disclosed herein are suitable for any of driver controlled, pedestrian controlled, remotely controlled, and autonomously controlled material handling vehicles.

As described herein, the present disclosure provides a method for transferring routes between one or more material handling vehicles. For example, a material handling vehicle may be driven along a route in a learning mode. Operation information may be collected as the material handling vehicle traverses the route in the learning mode. The operation information may be processed via a warehouse management system, and the processed route information may be transferred to another material handling vehicle to operate autonomously along the same, or a substantially similar, route.

FIG. 1 illustrates one non-limiting example of a material handling vehicle 100 according to the present disclosure. The material handling vehicle 100 can include a vehicle frame 102, traction wheels 104, a power section 108, and an operator compartment 110. The power section 108 may be disposed within the vehicle frame 102 and may include a battery configured to supply power to various components of the material handling vehicle 100. For example, the battery may supply power to a motor and/or transmission disposed within the power section 108 and configured to drive the traction wheels 104. In the illustrated non-limiting example, the traction wheels 104 are arranged under the power section 108. In other non-limiting examples, the traction wheels 104 may be arranged in another location under the vehicle frame 102.

The operator compartment 110 may include a handle (not shown) configured to allow an operator to control a speed and direction of travel of the material handling vehicle 100. In some non-limiting examples, the handle may be configured to manually steer and power the traction wheels 104. In some non-limiting examples, the handle may be removably coupled to the operator compartment 110 to enable an operator to remotely (i.e., from outside of the material handling vehicle 100) train the material handling vehicle 100 for operation as an autonomously guided vehicle (AGV). In some non-limiting examples, the handle may be removably connected to the operator compartment 110 via a quick-disconnect (e.g., a pin and plug). In some non-limiting examples, the handle, once removed from the material handling vehicle 100, may be configured to communicate wirelessly with a controller (not shown) on board the material handling vehicle 100.

The material handling vehicle 100 includes the operator compartment 110 arranged rearward of the power section 108 and having an operator opening 112 that opens towards lateral sides 114 of the material handling vehicle 100. In some non-limiting examples, the material handling vehicle 100 may be designed with the operator compartment arranged differently, for example, with an operator opening 112 that opens rearwardly.

The material handling vehicle 100 has a geometry that can be at least partially defined by a height 120, a width 122, and a length 124. The height 120 of the material handling vehicle 100 extends in a direction $Z_1$. The height 120, for example, may be defined as a maximum length between a surface on which the material handling vehicle 100 travels and a top surface 126 of the material handling vehicle 100. The width 122 of the material handling vehicle 100 extends from a first lateral side 114 to a second lateral side (not shown) in a direction $X_1$. The width 122, for example, may be defined as a maximum lateral distance across the material handling vehicle 100 in the direction $X_1$. The length 124 of the material handling vehicle 100 extends from a front section 128 to a rear section 130 of the material handling vehicle 100 in the direction $Y_1$. The length 124, for example, may be defined as a maximum distance between a surface 132 proximal to the front section 128 and a surface (not shown) proximal to the rear section 130.

Aspects of the geometry of the material handling vehicle 100 can additionally or alternatively be described by a front surface area 140, a lateral surface area 142, and a footprint 144. The front surface area 140 may be a surface area on the material handling vehicle 100 within a plane defined by the $X_1$ direction and the $Z_1$ direction. The lateral surface area 142 may be a surface area on the material handling vehicle 100 within a plane defined by the $Y_1$ direction and the $Z_1$ direction. The footprint 144 may be a surface area on the material handling vehicle 100 within a plane defined by the $X_1$ direction and the $Y_1$ direction. Additional or alternative aspects of the geometry of the material handling vehicle 100 may include a volume. In one example, the volume may be a product of the height 120, the width 122, and the length 124, which may define a prismatic volume occupied by the material handling vehicle 100.

Additional properties that may be unique to the material handling vehicle 100 can include a vehicle weight, a turning radius, a maximum speed, and other material handling components, such as forks and tugger components, for example.

Figure 2:
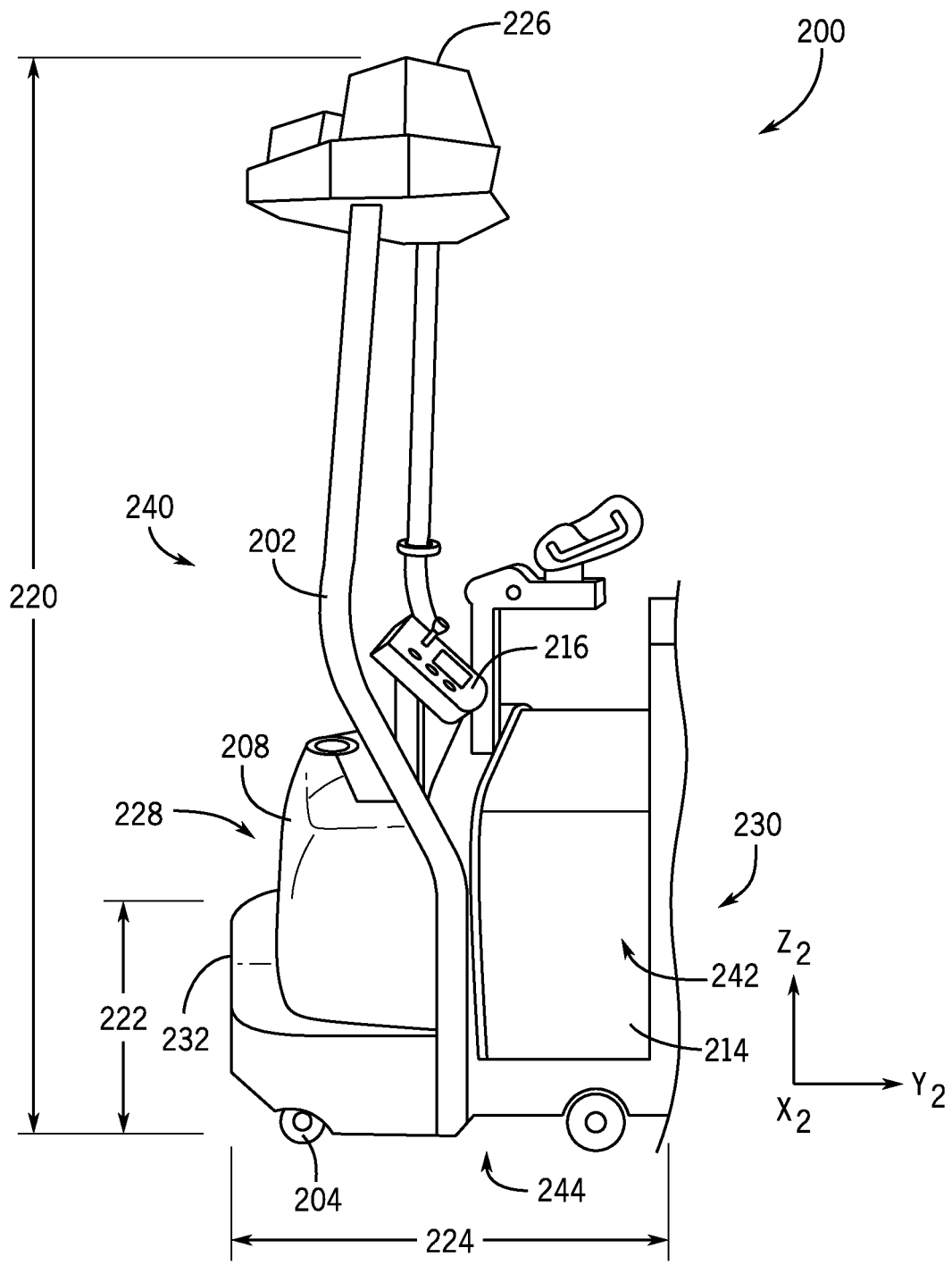
FIG. 2 is a side view of another material handling vehicle according to aspects of the present disclosure.

FIG. 2 illustrates one non-limiting example of another material handling vehicle 200 according to the present disclosure. The material handling vehicle 200 can include a vehicle frame 202, traction wheels 204, and a power section 208. The power section 208 may be disposed within the vehicle frame 202 and may include a battery configured to supply power to various components of the material handling vehicle 200. For example, the battery may supply power to a motor and/or transmission disposed within the power section 208 and is configured to drive the traction wheels 204. In the illustrated non-limiting example, the traction wheels 204 are arranged under the power section 108. In other non-limiting examples, the traction wheels 204 may be arranged in another location under the vehicle frame 202.

The material handling vehicle 200 may be an AGV configured to allow autonomous control of a speed and direction of travel via communication with a controller 216. In the illustrated non-limiting example, the material handling vehicle 200 does not include an operator compartment; however, other configurations are possible. For example, a material handling vehicle including an operator compartment can be configured to be operated autonomously. In one non-limiting example, the controller 216 may be configured to receive operation instructions from a warehouse management system 300, as will be further described with reference to FIGS. 3 and 4.

Similar to the material handling vehicle 100, the material handling vehicle 200 has a geometry that can be at least partially defined by a height 220, a width 222, and a length 224. The height 220 of the material handling vehicle 200 extends in a direction $Z_2$. The height 220, for example, may be defined as a maximum length between a surface on which the material handling vehicle 200 travels and a top surface 226 of the material handling vehicle 200. The width 222 of the material handling vehicle 200 extends from a first lateral side 214 to a second lateral side (not shown) in a direction $X_2$. The width 222, for example, may be defined as a maximum lateral distance across the material handling vehicle 200 in the direction $X_2$. The length 224 of the material handling vehicle 200 extends from a front section 228 to a rear section 230 of the material handling vehicle 200 in the direction $Y_2$. The length 224, for example, may be defined as a maximum distance between a surface 232 proximal to the front section 228 and a surface (not shown) proximal to the rear section 230.

Aspects of the geometry of the material handling vehicle 200 can additionally or alternatively be described by a front surface area 240, a lateral surface area 242, and a footprint 244. The front surface area 240 may be a surface area on the material handling vehicle 200 within a plane defined by the $X_2$ direction and the $Z_2$ direction. The lateral surface area 242 may be a surface area on the material handling vehicle 200 within a plane defined by the $Y_2$ direction and the $Z_2$ direction. The footprint 244 may be a surface area on the material handling vehicle 200 within a plane defined by the $X_2$ direction and the $Y_2$ direction. Additional or alternative aspects of the geometry of the material handling vehicle 200 may include a volume. In one example, the volume may be a product of the height 220, the width 222, and the length 224, which may define a prismatic volume occupied by the material handling vehicle 200.

Similar to the material handling vehicle 100, additional properties that may be unique to the material handling vehicle 200 can include a vehicle weight, a turning radius, a maximum speed, and other material handling components, such as forks and tugger components, for example.

Figure 3:
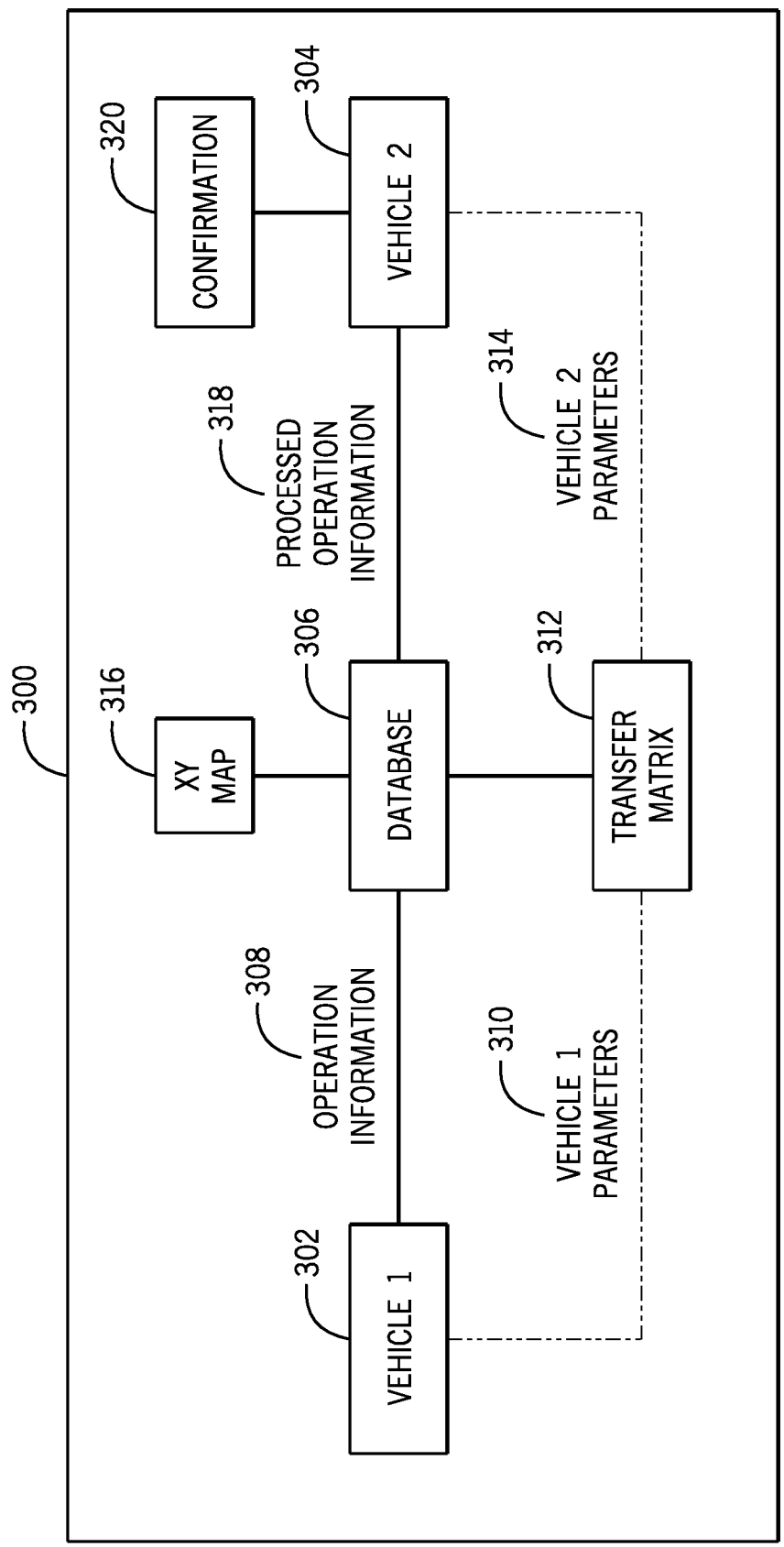
FIG. 3 is a schematic illustration of a warehouse management system according to aspects of the present disclosure.

FIG. 3 illustrates one non-limiting example of a warehouse management system 300 according to the present disclosure. In one example, the warehouse management is configured to send and receive operation data between a first vehicle 302 and a second vehicle 304. By way of example, the first vehicle 302 may be a material handling vehicle such as the material handling vehicle 100, and the second vehicle 304 may be a material handling vehicle such as the material handling vehicle 200. The material handling vehicle 100 and the material handling vehicle 200 have distinct geometries; however, in some embodiments, the first vehicle 302 and the second vehicle 304 may have substantially similar geometries.

The warehouse management system 300 includes a database 306 that can receive operation information 308 that is collected from the first vehicle 302 during a training operation procedure. An example of a training operation procedure can include setting the first vehicle 302 in a learning mode and navigating the first vehicle 302 around an operating environment and recording the route and/or operations of the first vehicle 302. Operations of the first vehicle 302 can include lifting and lowering forks to place or pick up a load, for example. The operation information 308 may be stored in the first vehicle 302 or remotely within the warehouse management system 300.

Figure 4:
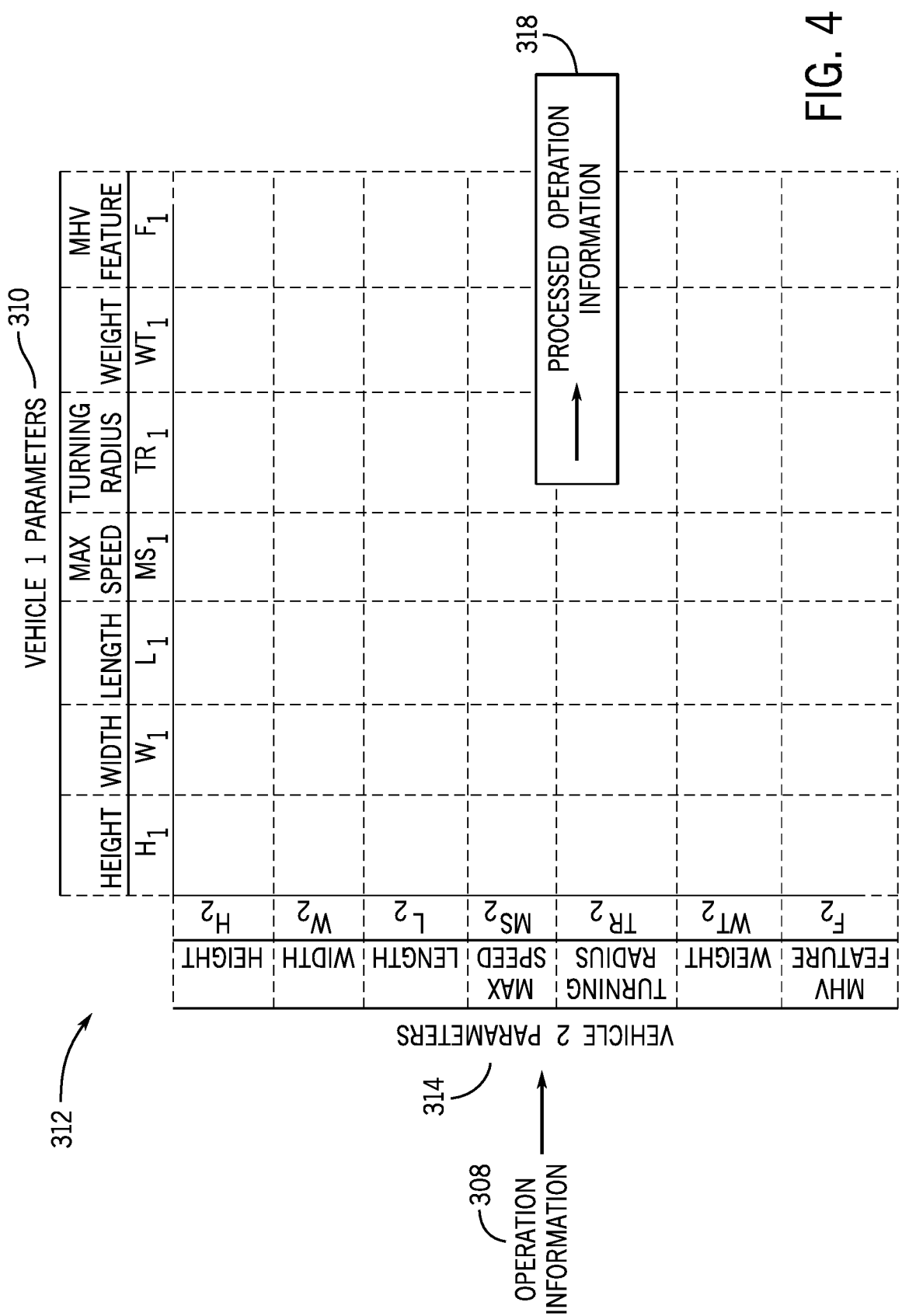
FIG. 4 is a schematic illustration of a transfer matrix of the warehouse management system of FIG. 3.

Vehicle parameters 310 of the first vehicle 302 can be inputted into the warehouse management system. In particular, the vehicle parameters 310 can be inputted into a transfer matrix 312. As illustrated in FIG. 4, the vehicle parameters 310 received by the transfer matrix 312 can include geometric aspects and other properties of first vehicle 302 as described above with reference to the material handling vehicles 100, 200. For example, the vehicle parameters 310 can include a vehicle height ($H_1$), a vehicle width ($W_1$), a vehicle length ($L_1$), a vehicle maximum speed ($MS_1$), a vehicle turning radius ($TR_1$), a vehicle weight ($Wt_1$), and a material handling vehicle feature ($F_1$), such as forks or a tugger. Other vehicle parameters 310 are possible. For example, any number of vehicle aspects that are quantifiably different between the first vehicle 302 and the second vehicle 304 may be used as vehicle parameters 310, 314.

The warehouse management system 300 further includes a map 316. In some embodiments, the map 316 is a coordinate map of the operating environment. The map 316 can be configured as a two-dimensional XY map of the operating environment, which may be a warehouse. In some embodiments, the map 316 can be generated via the first vehicle 302. In particular, the first vehicle 302 can traverse areas of the warehouse that are accessible to material handling vehicles and collect coordinates to build or modify the map 316. As illustrated in FIG. 3, the database 306 is in communication with the map 316 and the transfer matrix 312.

Similar to the vehicle parameters 310 of the first vehicle 302, vehicle parameters 314 of the second vehicle may be received by the transfer matrix 312. As illustrated in FIG. 4, the vehicle parameters 314 received by the transfer matrix 312 can include geometric aspects and other properties of second vehicle 304 as described above with reference to the material handling vehicles 100, 200. For example, corresponding vehicle parameters 314 can include a vehicle height ($H_2$), a vehicle width ($W_2$), a vehicle length ($L_2$), a vehicle maximum speed ($MS_2$), a vehicle turning radius ($TR_2$), a vehicle weight ($Wt_2$), and a material handling vehicle feature ($F_2$).

The transfer matrix 312 enables translation or modification between the first vehicle parameters 310 and second vehicle parameters 314 so that processed operation information 318 is a modified or translated version of the operation information 308 collected by the first vehicle 302. For example, if the turning radius ($TR_1$) of the first vehicle 302 is less than the turning radius ($TR_2$) of the second vehicle 304, the processed operation information 318 may direct the second vehicle 304 along a slightly modified, yet substantially similar, route as traversed by the first vehicle 302 and communicated by the operation information 308 to compensate for limited turning capabilities. In particular, the processed operation information 318 may instruct the second vehicle 304 to initiate a turn earlier than when the first vehicle 302 initiated the same turn.

In use, once the operation information 308 is process by the warehouse management system 300 via the map 316, the transfer matrix 312, and the database 306, the processed operation information 318 can be transferred to the second vehicle 304. In some embodiments, the processed operation information 318 is transferred to a controller of the second vehicle 304, similar to the controller 216 of the material handling vehicle 200.

In some embodiments, when the processed operation information 318 is successfully transferred, a confirmation 320 may be visible and/or audible. In some embodiments, the confirmation 320 is displayed on the second vehicle 304. In some embodiments, the confirmation 320 is displayed remotely from the second vehicle 304. When the processed operation information 318 is successfully transferred to the second vehicle 304, the second vehicle 304 can execute a navigational and operational procedure that is substantially similar to a navigational and operational procedure traversed by the first vehicle 302. In some embodiments, the transfer matrix 312 can be configured to receive parameters from a plurality of material handling vehicles, and a plurality of processed operation information can be processed for the plurality of material handling vehicles.

Figure 5:
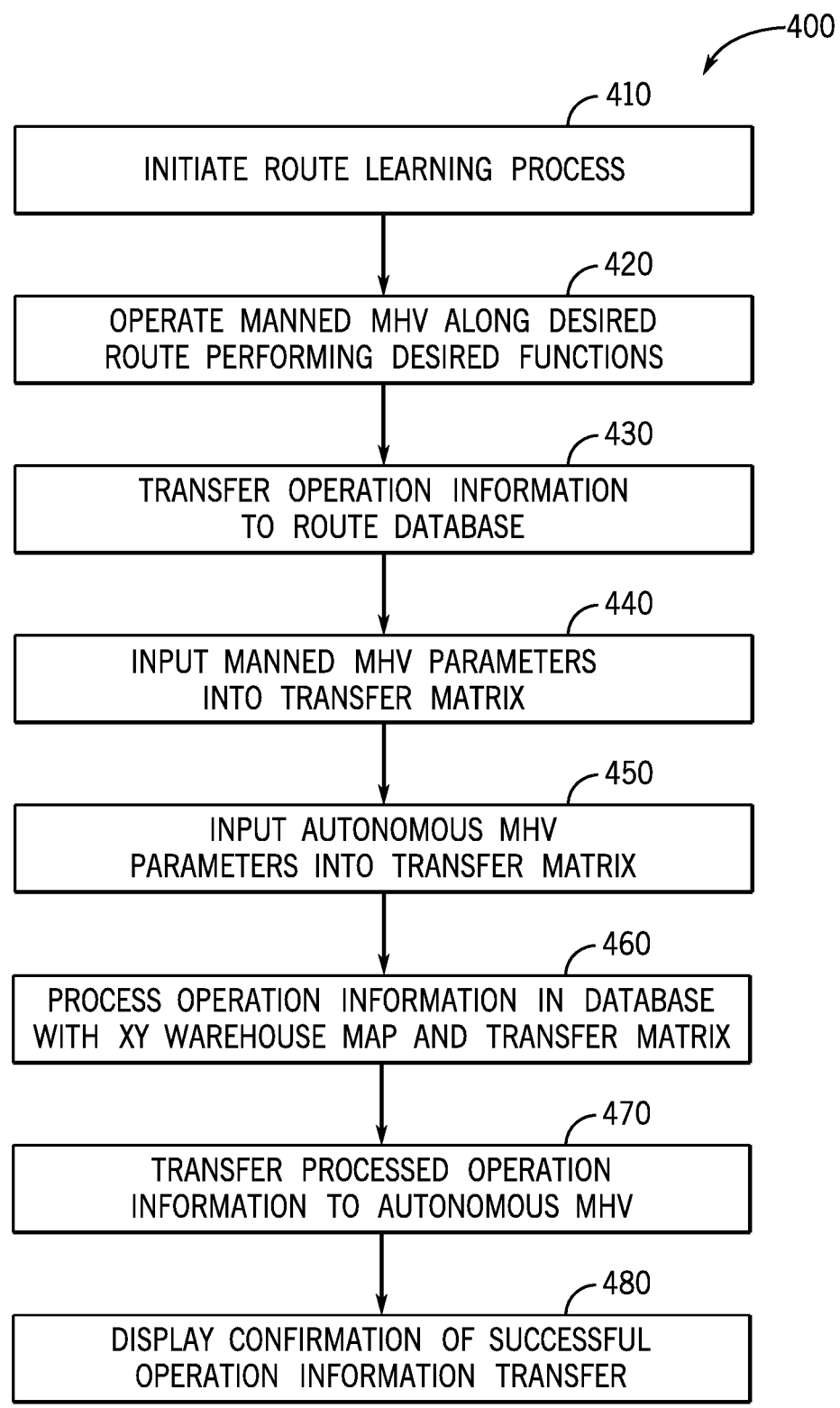
FIG. 5 is a flowchart for a method of transferring a route from a first material handling vehicle to a second material handling vehicle according to aspects of the present disclosure.

Now that various aspects of the warehouse management system 300 including a first vehicle 302 transferring operation information 308 to a second vehicle 304 have been described above, a general description of a method 400 for transferring route information will be described with reference to FIG. 5. It should be understood that the following description is provided as an example and is in no way meant to be limiting.

At step 410, an operator of the first vehicle 302 may initiate a route learning process via a switch, toggle, button, or any other initiation mechanism such that the first vehicle 302 is in a learning mode.

At step 420, the operator may navigate the first vehicle 302 along a route and perform material handling functions. For example, the operator may navigate the first vehicle 302 from a first location in the warehouse, pick up a load, navigate to a second location in the warehouse, and deliver the load. It should be appreciated that a plurality of routes and a corresponding plurality of functions may be recorded in step 420.

At step 430, the operation information 308 is transferred to the database 306 of the warehouse management system 300. In some embodiments, the operation information 308 may be transferred wirelessly. In other embodiments, the operation information 308 may be transferred via a physical connection or memory storage device.

At step 440, the first vehicle parameters 310 may be communicated to the transfer matrix 312, and subsequently or simultaneously, at step 450 the second vehicle parameters 314 may be communicated to the transfer matrix 312. In some embodiments, step 450 can occur before or after step 440. Similarly, in some embodiments, steps 440 and 450 can occur before, after, or in parallel with any of steps 410, 420, and 430. In some embodiments, the transfer matrix 312 can be populated with vehicle parameter inputs that are stored in the database 306.

At step 460, the operation information 308 may be processed with the transfer matrix 312 and the XY coordinate map 316 to generate the processed operation information 318. At step 470, the processed operation information 318 may be transferred to the second vehicle 304. At step 480, the confirmation 320 may indicate a successful route transfer to the second vehicle 304. In some embodiments, once the processed operation information 318 is successfully transferred to the second vehicle 304, a signal may initiate the second vehicle 304 to move along the desired route and perform operations autonomously.

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

I claim:

1. A method for transferring route information between material handling vehicles, the method comprising:
   operating a first material handling vehicle along a route and collecting operation information, the first material handling vehicle having a first geometry;
   transferring the operation information to a warehouse management system, the warehouse management system including a transfer matrix;
   processing the operation information with the transfer matrix; and
   transferring processed operation information to a second material handling vehicle, the second material handling vehicle having a second geometry.

2. The method of claim 1, further comprising:
   inputting a vehicle parameter of the first material handling vehicle into the transfer matrix; and
   inputting a corresponding vehicle parameter of the second material handling vehicle into the transfer matrix.

3. The method of claim 2, wherein the vehicle parameter is selected from the group consisting of vehicle height, vehicle width, vehicle length, maximum vehicle speed, vehicle turning radius, and vehicle weight.

4. The method of claim 1, further comprising:
   displaying a confirmation that the processed operation information was successfully transferred to the second material handling vehicle.

5. The method of claim 4, wherein the confirmation is displayed on the second material handling vehicle.

6. The method of claim 1, wherein the warehouse management system further includes an XY map of a warehouse.

7. The method of claim 1, wherein the first material handling vehicle is a manned vehicle comprising an operator compartment.

8. The method of claim 1, wherein the second material handling vehicle is an unmanned vehicle and configured to operate autonomously.

9. The method of claim 1, wherein the first geometry is distinct from the second geometry.

10. A method for operating an autonomous material handling vehicle, the method comprising:
    guiding a manned material handling vehicle along a route and collecting operation information;
    transferring the operation information to a database, the database including a map;
    inputting a parameter of the manned material handling vehicle and of an unmanned material handling vehicle into a transfer matrix;
    processing information from the database with the transfer matrix;
    transferring processed operation information to the unmanned material handling vehicle; and
    operating the unmanned material handling vehicle along the route.

11. The method of claim 10, wherein the map is a two-dimensional map of a warehouse.

12. The method of claim 10, wherein the manned material handling vehicle has a first geometry and the unmanned material handling vehicle has a second geometry, and
    wherein the first geometry is distinct from the second geometry.

13. The method of claim 10, wherein the unmanned material handling vehicle is a plurality of unmanned material handling vehicles having a plurality of geometries.

14. The method of claim 10, wherein the transfer matrix is configured to translate the operation information of the manned material handling vehicle to the processed operation information to compensate for geometric disparities between the manned material handling vehicle and the unmanned material handling vehicle.

15. A warehouse management system configured to support warehouse operations, the warehouse management system comprising:
    a coordinate map of an operating environment;
    a database; and a transfer matrix configured to receive quantitative parameters of a first material handling vehicle and a second material handling vehicle, and to transfer processed operation information to the second material handling vehicle based on collected operation information from the first material handling vehicle, wherein at least one of the quantitative parameters of the first material handling vehicle are different than the quantitative parameters of the second material handling vehicle.

16. The warehouse management system of claim 15, wherein the coordinate map is an XY coordinate map.

17. The warehouse management system of claim 16, wherein the XY coordinate map is generated by the first material handling vehicle traversing the operating environment.

18. The warehouse management system of claim 15, wherein the first material handling vehicle has a first geometry that is different from a second geometry of the second material handling vehicle.

19. The warehouse management system of claim 15, wherein the transfer matrix receives at least one vehicle parameter selected from vehicle length, vehicle width, vehicle height, vehicle weight, vehicle turning radius, or maximum vehicle speed.

20. The warehouse management system of claim 15, wherein the database is configured to receive operation information from the first material handling vehicle.

* * * * *